United States Patent Office 3,432,791
Patented Mar. 11, 1969

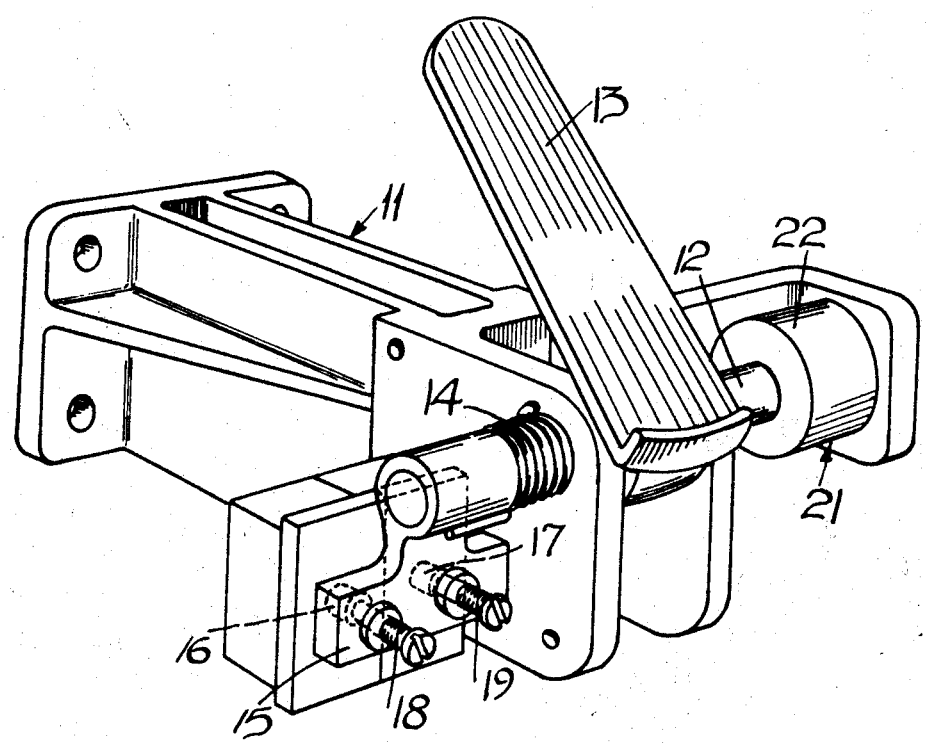

3,432,791
THROTTLE PEDAL UNIT FOR AN
INDUSTRIAL TRUCK
Norman Harold George Palmer, Sutton Coldfield, England, assignor to Eaton Yale & Towne Inc., a corporation of Ohio
Continuation of application Ser. No. 505,251, Oct. 26, 1965. This application Dec. 22, 1967, Ser. No. 693,024
Claims priority, application Great Britain, Nov. 17, 1964, 46,723/64
U.S. Cl. 338—198
Int. Cl. H01c 5/08
2 Claims

ABSTRACT OF THE DISCLOSURE

An electrically driven truck including an electric motor, the speed of which is controlled by an electric control system including a microswitch and potentiometer actuated by a throttle pedal moved by the truck operator. Actuators for the potentiometer and microswitch and a throttle pedal are all mounted on a shaft rotatable a limited angular movement from a rest position with a lever fixed to the shaft having microswitch actuating means movable away from the microswitch upon initial rotation of the shaft after which the potentiometer is operated to increase the speed of the motor.

---

This is a continuation of application 505,251 filed Oct. 26, 1965, now abandoned.

Where the drive motor of an industrial truck is operated by an electronic control system, the throttle pedal of the truck is required first to operate one or more microswitches and then as it is depressed further to move a slider across a potentiometer to increase the speed of the truck. The throttle pedal moves the slider between predetermined minimum and maximum voltage levels, and so the larger the range of angular movement over which the slider is moved, the finer will be the control of the speed of the motor. The total angular movement of the throttle pedal is of course limited, and so the smaller the angular movement required to operate the microswitches the better. The obvious arrangement is to mount the throttle pedal on a shaft which carries cams for actuating the microswitches during the initial movement of the pedal, further movement of the shaft actuating the potentiometer. However, such an arrangement is unsatisfactory, because the cams require too great a proportion of the angular movement of the pedal to operate the microswitches, so reducing the fineness of speed regulation which is obtained.

The present invention provides a unit which is considerably better than an arrangement utilising cams for two reasons. Firstly, where cams are used each microswitch is actuated by a cam when the throttle pedal is depressed, and when the throttle pedal is released the microswitch reverts to its normal position. Thus, if the microswitch is required to close a circuit when the throttle pedal is depressed, a microswitch having normally open contacts is used. In the unit according to the present invention, however, the or each microswitch is in its actuated condition until the throttle pedal is depressed, and then assumes its normal condition. Thus, in the example quoted, the unit would employ a microswitch having normally closed contacts which will be held open when the throttle pedal is in its rest position. Moreover the microswitch or microswitches are actuated by means movable with a lever extending radially from the shaft. The lever acts to amplify the movement of the shaft, and this feature together with the arrangement of the microswitches enables one or several microswitches to be operated within a small initial angular movement of the shaft, so that practically the whole of the angular movement of the pedal is available for varying the potentiometer.

The accompanying drawing is a schematic perspective view illustrating one example of the invention. The detailed mechanical arrangement of the unit will of course depend on the particular truck for which it is intended.

Referring to the drawing, there is provided a body 11 adapted to be connected to the frame of an industrial truck, the body supporting a shaft 12 for angular movement. Secured to the shaft is a throttle pedal 13, the arrangement being such that depression of the throttle pedal moves the shaft 12 from a rest position angularly towards a full throttle position, the limits of travel of the shaft being determined by stops (not shown) on the body 11. The shaft is urged towards its rest position by a torsion spring 14 actuated between the body 11 and a level 15 secured to and extending radially from the shaft.

Secured to the body 11 are a pair of microswitches 16, 17 and extending through the lever are a pair of adjustable actuating members 18, 19 which are aligned with the microswitches respectively. The adjustment is such that with the shaft in its rest position both microswitches have their operating members depressed by the actuating members 18, 19 respectively. As soon as the pedal is depressed, one of the actuating members moves out of contact with its corresponding operating member, so that one of the microswitches is returned to its normal position, and after a further short movement of the pedal, the other microswitch is operated in similar fashion.

The shaft also operates a potentiometer 21 which controls the speed of an electric motor driving the truck. The potentiometer includes a fixed part 22 secured to and angularly adjustable relative to the body 11, and carrying a resistance element extending in a circular path, and a movable part 23 secured to the shaft 12 and carrying a slider movable over the resistance element. The arrangement is such that by varying the angular position of the part 22, the slider can be made to move onto the resistance element at a given angular position of the throttle pedal. In practice, it is required that the slider moves onto the element as the second microswitch is actuated.

Electrical connections (not shown) are made to the microswitches and potentiometer in any convenient manner, and the entire assembly apart from the throttle pedal is enclosed by a pair of interconnected cover pieces (not shown).

Preferably, the actuating members 18, 19 are spring-loaded, so that the force that can be applied to the microswitches is limited.

I claim:
1. In and electrically driven industrial truck, said truck comprising in combination a truck body, an electric motor for driving the truck, an electrical control system for varying the speed of the motor including a throttle pedal unit, said pedal unit comprising; at least one microswitch and a potentiometer, a shaft, means supporting said shaft for angular movement relative to the body, a throttle pedal secured to the shaft for rotating the shaft a limited angular amount from a rest position, resilient means urging the shaft to a rest position, a lever fixed to and extending radially from the shaft, said microswitch carried by the body, an actuating member secured to the lever for actuating the microswitch when the shaft is in its rest position, said member being adjustable relative to the lever, and said potentiometer operated by the shaft for controlling the speed of the motor, the arrangement being such that when the throttle pedal is initially depressed, the microswitch actuating means moves away from the microswitch which causes it to revert to its normal condition and then the voltage at the slide of the potentiometer is changed with further movement of the pedal to increase the speed of the motor.

2. A truck as claimed in claim 1 in which said lever is secured to one end of said shaft and said potentiometer is secured to the other end of said shaft.

References Cited
UNITED STATES PATENTS 3,241,019   3/1966   Gross _____ 318—139

ROBERT K. SCHAEFER, *Primary Examiner.*

H. J. HOHAUSER, *Assistant Examiner.*

U.S. Cl. X.R.

200—61.89, 86.5